(12) United States Patent
Cox et al.

(10) Patent No.: US 7,987,433 B2
(45) Date of Patent: Jul. 26, 2011

(54) METHODS, SYSTEMS AND COMPUTER PROGRAM PRODUCTS FOR MULTIDIMENSIONAL MOVEMENT IN A DISPLAY WINDOW

(75) Inventors: Patrick Cox, Raleigh, NC (US); Velda Bartek, Apex, NC (US); Richard Spinks, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1618 days.

(21) Appl. No.: 10/414,350

(22) Filed: Apr. 15, 2003

(65) Prior Publication Data

US 2004/0207648 A1    Oct. 21, 2004

(51) Int. Cl.
*G06F 3/00* (2006.01)
(52) U.S. Cl. ........ 715/786; 715/784; 715/787; 715/779; 715/830; 715/833
(58) Field of Classification Search .................. 715/864, 715/784–786, 779, 787, 830, 833
See application file for complete search history.

(56) References Cited

U.S. PATENT DOCUMENTS

| | | | | |
|---|---|---|---|---|
| 5,059,965 A * | 10/1991 | Geiser | ....................... | 340/995.23 |
| 5,485,174 A | 1/1996 | Henshaw et al. | ............. | 345/123 |
| 5,664,132 A | 9/1997 | Smith | ........................... | 345/252 |
| 5,825,349 A | 10/1998 | Meier et al. | ................... | 345/123 |
| 5,825,675 A | 10/1998 | Want et al. | .................. | 364/708.1 |
| 5,864,330 A * | 1/1999 | Haynes | .......................... | 715/856 |
| 5,943,679 A * | 8/1999 | Niles et al. | ...................... | 715/526 |
| 6,300,966 B1 * | 10/2001 | Gregory et al. | ............... | 715/736 |
| 6,384,845 B1 * | 5/2002 | Takaike | ........................ | 715/786 |
| 6,424,359 B1 * | 7/2002 | Kobayashi | ..................... | 715/786 |
| 6,445,398 B1 * | 9/2002 | Gerba et al. | ................... | 715/721 |
| 7,039,879 B2 * | 5/2006 | Bergsten et al. | ............... | 715/853 |
| 2002/0076231 A1 * | 6/2002 | Akiba et al. | ..................... | 399/82 |
| 2005/0210404 A1 * | 9/2005 | Hakiel et al. | ................... | 715/786 |

FOREIGN PATENT DOCUMENTS

JP           2000322175         11/2000

* cited by examiner

*Primary Examiner* — Ryan F Pitaro
(74) *Attorney, Agent, or Firm* — Jeffrey T. Holman

(57) ABSTRACT

Scrolling data in a display window having peripheral controls on a user interface of a data processing system includes a two-dimensional scrolling control that is integrated as part of the peripheral controls. The two-dimensional scrolling control includes at least three directional components. Each directional component is associated with a direction on the display window, and at least one of the directions corresponds to a change in both of the two dimensions. User input is accepted from a user. The user input includes a selected directional component. The data in the display window is scrolled in the direction associated with the selected directional component.

26 Claims, 10 Drawing Sheets

METHODS, SYSTEMS AND COMPUTER PROGRAM PRODUCTS FOR MULTIDIMENSIONAL MOVEMENT IN A DISPLAY WINDOW

FIELD OF THE INVENTION

The present invention relates to user interfaces of a data processing system and, more particularly, to manipulating a display window having peripheral controls on a user interface of a data processing system.

BACKGROUND OF THE INVENTION

Data processing systems such as a personal computer, laptop computer, pervasive computing device such as a personal data assistant (PDA), smartphone, or other mobile terminal typically display data or content in a display window of a user interface. The content for display may be larger than the display window. Various controls have been used to manipulate the content in the display window so that the user can control what portion of the data is displayed.

Display windows typically have controls that are peripheral to the display window so that the content can be manipulated without interfering with the display window. For example, peripheral controls on a display window may include scroll bars that extend along the horizontal and vertical periphery of the display window. A scrolling icon within the scroll bar can be selected and moved by controls such as a mouse that can manipulate a cursor to select the scrolling icon or the icon can be selected by a user touching the display window on a touch sensitive screen. Scroll bars may also allow a user to select a region above or below the scrolling icon to move the content in the display in a vertical or horizontal direction. This can allow "page" by "page" scrolling such that the content moves in increments that are about the area of the page in one direction. Other examples of controls that may be peripheral to the display window include control icons that perform some function when selected by the user. Functions performed by control icons can include printing or saving a document, opening a new document, formatting text, reloading or refreshing the content, loading selected content for viewing and the like.

Data processing systems have been reduced in size so that, in some instances, systems can be held in a single hand such as in the case of PDAs and smartphones. The display area in such devices may be relatively small, and the content for display may be significantly larger than the display area. Users may be required to scroll both horizontally and vertically to locate and view information.

Scrolling using conventional scroll bars in such an environment can require the user to perform separate actions to manipulate both the horizontal and the vertical scroll bars. For example, when the content is displayed within a display area on a handheld device, instead of seeing the entire page or the desired information in the display area, the user typically scrolls to navigate line by line or "page" by "page" along one axis. Then, the user can repeat those actions to move along the other axis in order to locate the desired content. Similar problems may be experienced even with relatively large display windows particularly when the content is large, such as in a spreadsheet.

SUMMARY OF THE INVENTION

According to embodiments of the present invention, methods of scrolling data in a display window having peripheral controls on a user interface of a data processing system are provided. A two-dimensional scrolling control is integrated as part of the peripheral controls. The two-dimensional scrolling control includes at least three directional components. Each directional component is associated with a direction on the display window, and at least one of the directions corresponds to a change in both of the two dimensions. User input is accepted from a user. The user input includes a selected directional component. The data in the display window is scrolled in the direction associated with the selected directional component.

In further embodiments according to the present invention, a two-dimensional scrolling control for controlling a display window having peripheral controls that displays data on a data processing system is provided. The scrolling control includes at least three directional components. Each directional component is associated with a direction on the display window, and at least one of the directions corresponds to a change in both of the two dimensions. The directional components are configured to accept user input from a user to select a directional component. The data in the display window is scrolled in the direction associated with the selected directional component. The two-dimensional scrolling control is integrated as part of the peripheral controls.

While the invention has been described above primarily with respect to the method and scrolling control aspects of the invention, both systems and/or computer program products are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by those of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMS, optical storage devices, or magnetic storage devices.

Computer program code for carrying out operations of the present invention may be written in an object oriented programming language such as Java@, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention provides for the manipulation of data in a display window on a user interface of a data processing system. A two-dimensional scrolling control can be provided so that data can be scrolled in the display window simultaneously in both of the two dimensions responsive to user input.

Figure 1:
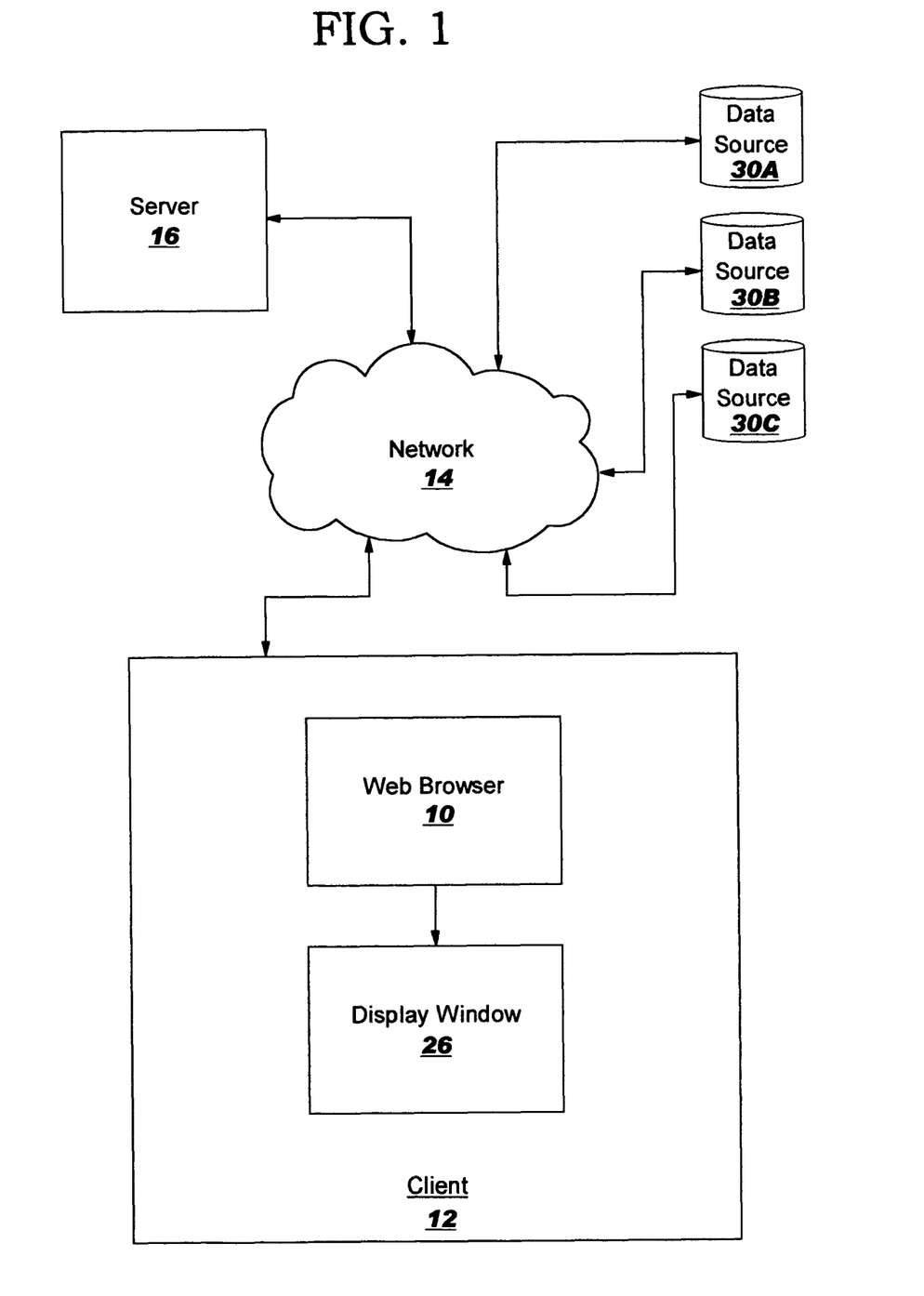
FIG. 1 is a block diagram of a system according to embodiments of the present invention.

Various embodiments of the present invention will now be described with reference to FIGS. 1 through 9. FIG. 1 illustrates a network environment in which embodiments of the present invention may be utilized. As will be appreciated by those of skill in the art, however, the operations of embodiments of the present invention may be carried out on a single processing system with or without access to a network such as an intranet or the Internet. As seen in FIG. 1, a client data processing system 12, such as a personal computer, laptop computer, pervasive computing device such as a personal data assistant (PDA), smartphone, or other mobile terminal, may utilize a web browser 10 or other application or program to communicate over network 14 to another data processing system which may act as a server 16. The web browser 10 can communicate with a display window 26 to display data. The network 14 may be an intranet or the Internet or other networks known to those of skill in the art.

As is further illustrated in FIG. 1, the server 16 can be in communication with data sources 30A, 30B, and 30C. The data sources 30A, 30B, and 30C can be computer servers, processing systems, or other networks that can send data to the client data processing system 12 over the network 14. The web browser 10 can display the data in the display window 26, which can be viewed and manipulated by the user.

Figure 2:
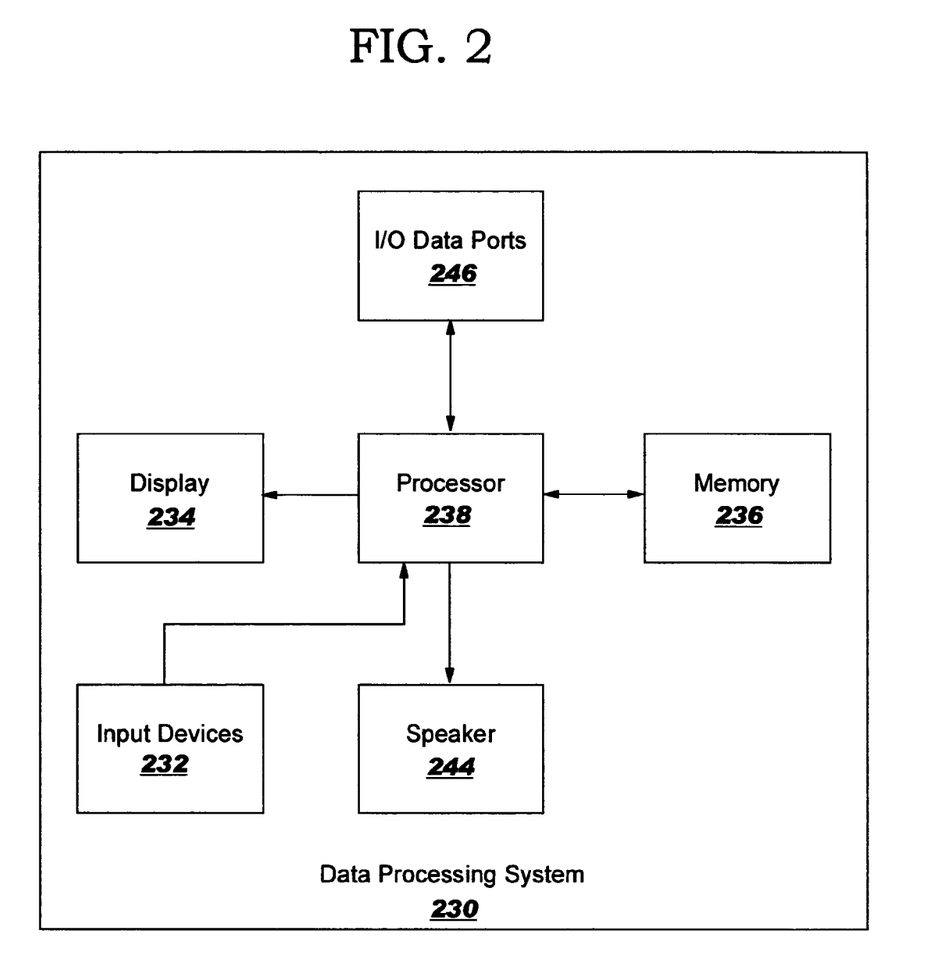
FIG. 2 is a block diagram of a data processing system according to embodiments of the present invention.

Referring now to FIG. 2, exemplary embodiments of a data processing system 230 in accordance with embodiments of the present invention typically includes input device(s) 232 such as a keyboard or keypad, touch sensitive screen, light sensitive screen, or mouse, a display 234, and a memory 236 that communicate with a processor 238. The data processing system 230 may further include a speaker 244, and an I/O data port(s) 246 that also communicates with the processor 238. The I/O data port 246 can be used to transfer information between the data processing system 230 and another computer system or a network (e.g., the Internet). These components may be conventional components such as those used in many conventional data processing systems which may be configured to operate as described herein. Furthermore, as will be appreciated by those of skill in the art, the data processing system 230 may be configured as the client 12 or the server 16.

Figure 3:
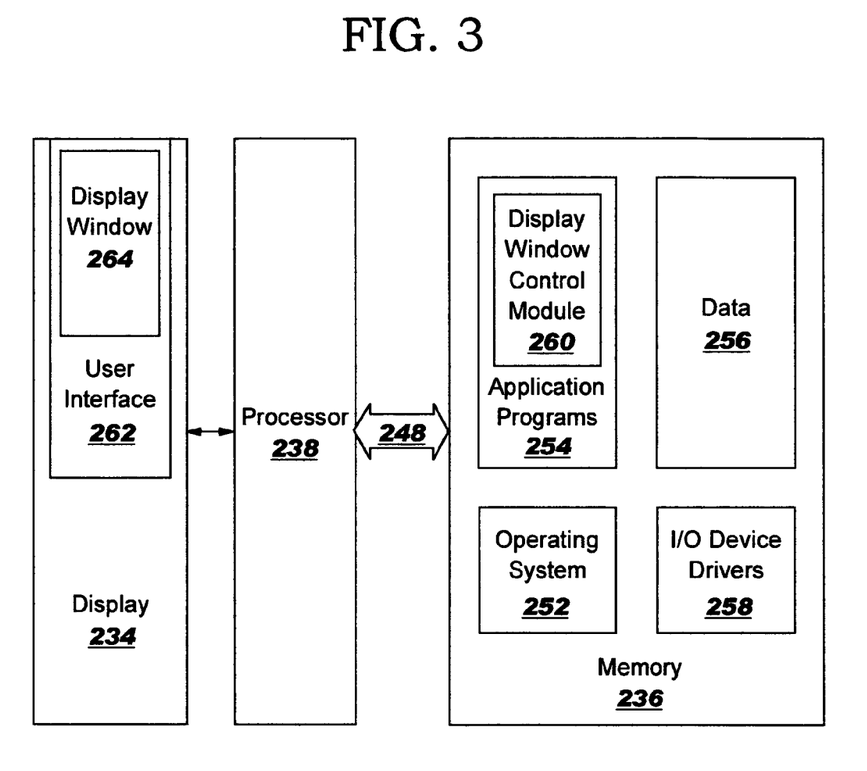
FIG. 3 is a more detailed block diagram of data processing systems according to embodiments of the present invention.

FIG. 3 is a block diagram of embodiments of data processing systems that illustrates systems, methods, and computer program products in accordance with the present invention. The processor 238 communicates with the memory 236 via an address/data bus 248. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000, or WindowsXP from Microsoft Corporation, Redmond, Wash., Unix or Linux. The I/O device drivers 258 typically include software routines accessed through the operating system 252 by the application program 254 to communicate with devices such as the input devices 232, the display 234, the speaker 244, the I/O data port(s) 246, and certain components of the memory 236. The display 234 includes a user interface 262 that displays data 256 with a display window 264. The application programs 254 are illustrative of the programs that implement the various features of the data processing system 230 and preferably include at least one application which provides the data scrolling aspects of embodiments of the present invention. Finally, the data 256 represents the static and dynamic data used by the application programs 254, the operating system 252, the I/O device drivers 258, and other software programs that may reside in the memory 236. The data 256 can also be displayed in the display window 264.

As is further seen in FIG. 3, the application programs 254 preferably include display window control module 260. The display window control module 260 preferably carries out operations as described herein for providing a two-dimensional scrolling control. Thus, the display window control module 260 may provide operations of one or more of the display window control functions to the display window 264.

While the present invention is illustrated, for example, with reference to a display window control module 260, as will be appreciated by those of skill in the art, the display window control module 260 may also be incorporated into other components, such as the operating system 252. Thus, the present invention should not be construed as limited to the configuration of FIG. 3 but is intended to encompass any configuration capable of carrying out the operations described herein.

Figure 4A:
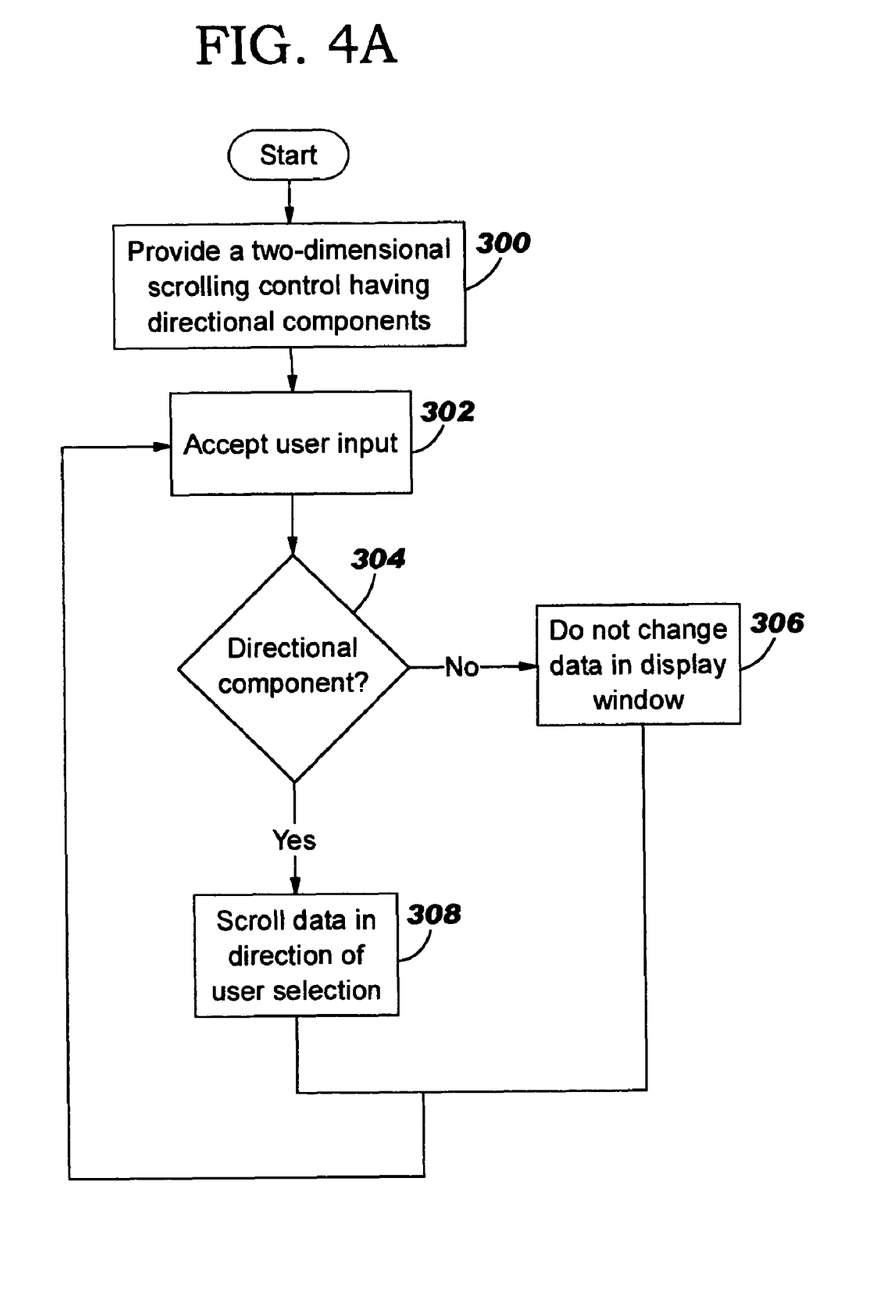
FIG. 4A is a flowchart illustrating operations of a two-dimensional scrolling control according to embodiments of the present invention.

Embodiments of the present invention will now be described in more detail with reference to FIG. 4A, which is a flowchart illustration of operations carried out by the display window control module 260. As seen in FIG. 4A, the display window control module 260 may provide a two-dimensional scrolling control having directional components (block 300). Each of the directional components corresponds to a direction in the display window 264. At least one of the directional components can correspond to a change in both of the two dimensions. For example, if the display window 264 has a vertical and horizontal dimension, at least one of the directional components corresponds to movement in both the vertical and horizontal directions, e.g., a diagonal direction with respect to a horizontal and vertical direction on the display window 264.

The display window 264 may have peripheral controls that can provide operations such as manipulating the data in the display window 264. As used herein, a "peripheral control" is a control icon that is situated adjacent to the periphery of the display window 264. The two-dimensional scrolling control may be integrated as part of the peripheral controls. For example, the peripheral controls can include a control portion extending along a horizontal periphery of the display window and another control portion extending along a vertical periphery of the display window. The two-dimensional scrolling control may be at a common intersection between the two control portions.

Referring to FIG. 4A, the data processing system accepts user input (Block 302). The user input can be a selection of one of the directional components. The directional component may be selected using various techniques such as a cursor selection made with a mouse, a keyboard selection, a physical selection on a touch-sensitive screen, activation of a light sensitive screen, laser activation, and other techniques known to those of skill in the art. If the user input is a selection of a directional component (Block 304), the data in the display window is scrolled in the direction of the user selection (Block 308). If the user does not select a directional component (Block 304), then the data in the display window is not changed (Block 306).

Figure 4B:
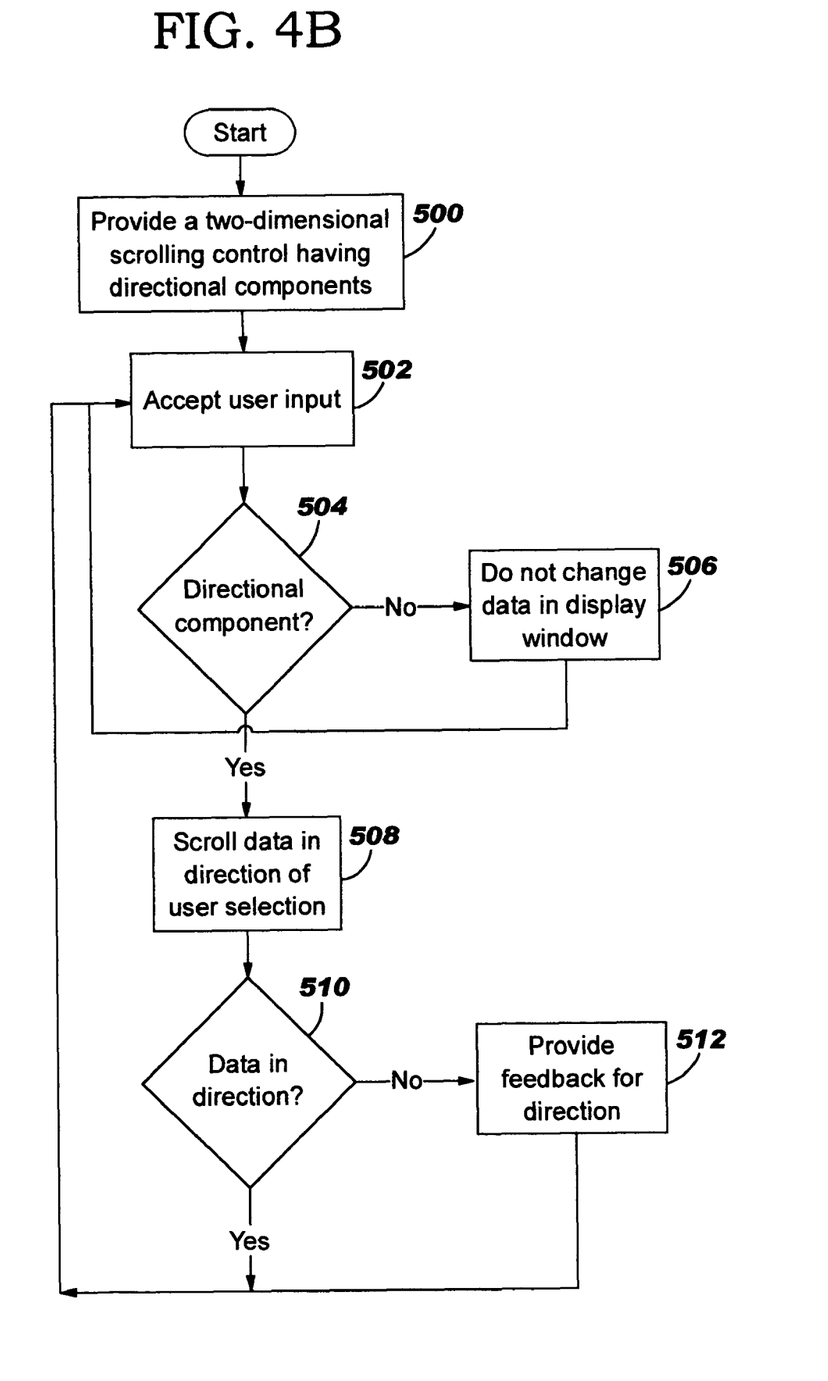
FIG. 4B is a flowchart illustrating operations of a two-dimensional scrolling control according to further embodiments of the present invention.

FIG. 4B illustrates operations according to further embodiments of the present invention where feedback is provided when scroll limits are reached. A two-dimensional scrolling control having directional components is provided (Block 500). User input can be accepted (Block 502), and if the user input is a directional component (Block 504), the data is scrolled in the direction of the user selection (Block 508). If there is data in the direction of the user selection (Block 510), then the processor loops back to accept user input (Block 502). If there is no additional data in the direction of the user selection (Block 510), feedback can be provided for the selected data (Block 512). The feedback can be auditory, e.g., a sound through a speaker, or visual, e.g., the respective directional component changes color and/or disappears from the screen. If there is no data in the direction of the user selection at the time that the user makes the selection, it may not be possible to scroll data in the direction of the user selection. That is, Block 508 may be omitted if there is no data in the selected direction. If the user does not select a directional component (Block 504), then the data in the display window is not changed (Block 506).

Figure 5:
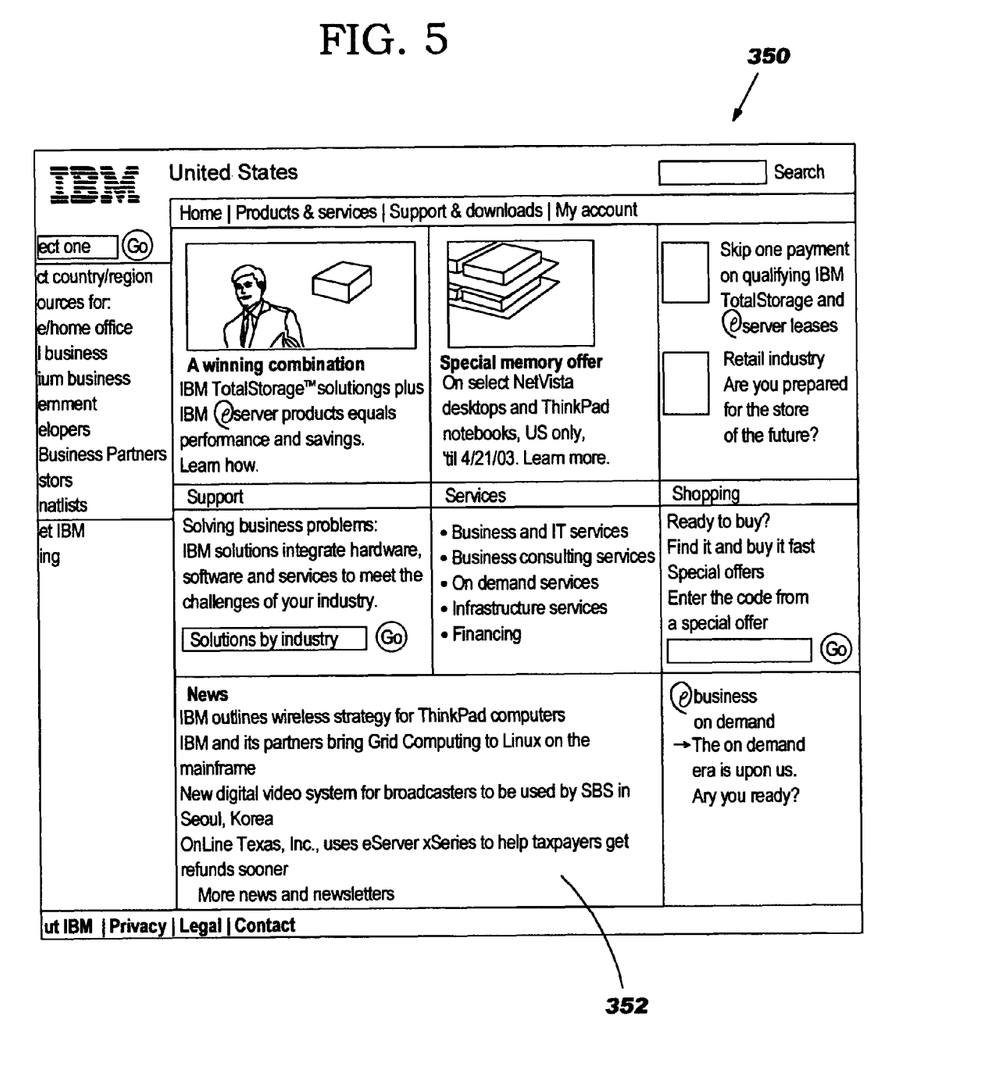
FIG. 5 is a screen shot illustrating data that can be displayed in a data processing system according to embodiments of the present invention.

FIG. 5 illustrates a display window 350 that displays data 352. A relatively small display window may not be capable of displaying the entire content of the data 352. An example of such a display window is shown in FIGS. 6 and 7.

Figure 6:
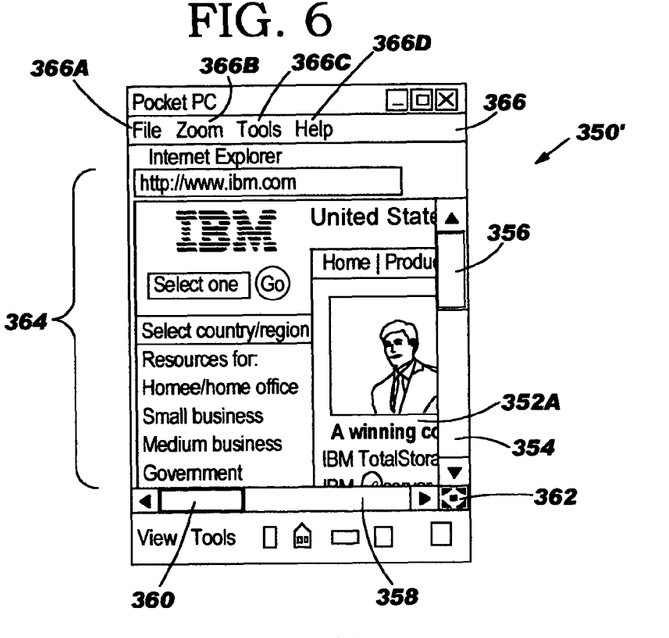
FIG. 6 is a screen shot illustrating a portion of the data in FIG. 5 in a display window having peripheral controls and a two-dimensional scrolling control according to embodiments of the present invention.
Figure 7:
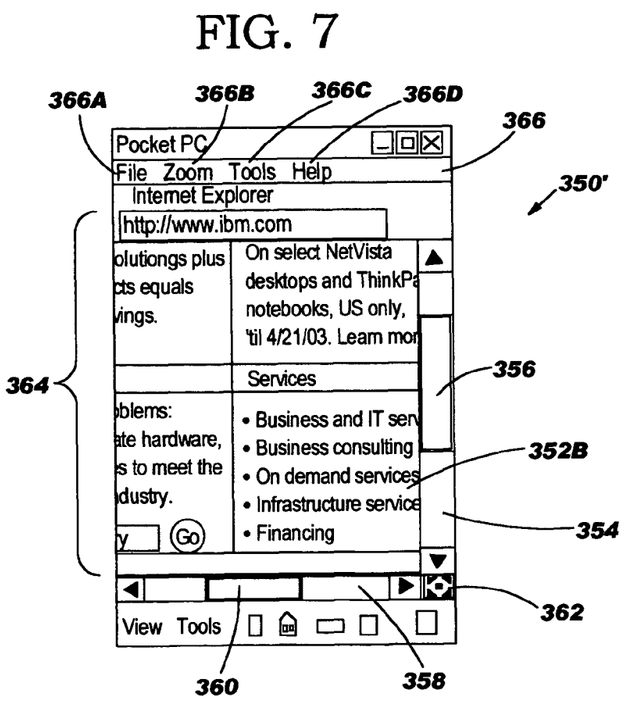
FIG. 7 is a screen shot illustrating the display window of FIG. 6 after user input is received by the two-dimensional scrolling control according to embodiments of the present invention.

The display window 350' in FIGS. 6 and 7 includes a display area 364 that displays data 352A, 352B. The displayed data 352A, 352B is a portion of the data 352 shown in FIG. 5. The display area 364 has peripheral controls 354, 358, and 366. The peripheral controls 366 at the top of the display window 350' include selections such as a file selection 366A for controlling the file, a "zooming" selection 366B for enlarging the resolution of the data 352A, 352B, a "tools" selection 366C for selecting miscellaneous controls for manipulating the displayed data, and a help selection 366D for selecting an instructional menu commonly referred to as a "help" menu.

The peripheral controls 354 extend along the vertical periphery of the display area 364, and the peripheral controls 358 extend along the horizontal periphery of the display area 364. The horizontal and vertical peripheral controls 354, 358 shown are examples of scroll bars. That is, when the scroll icons 356, 360 are selected by a user, the data 352A, 352B scrolls in the direction selected by the user. For example, if the user moves the horizontal scroll icon 360 to the right, the data 352A, 352B shown in the display window would shift to the right.

Figure 8:
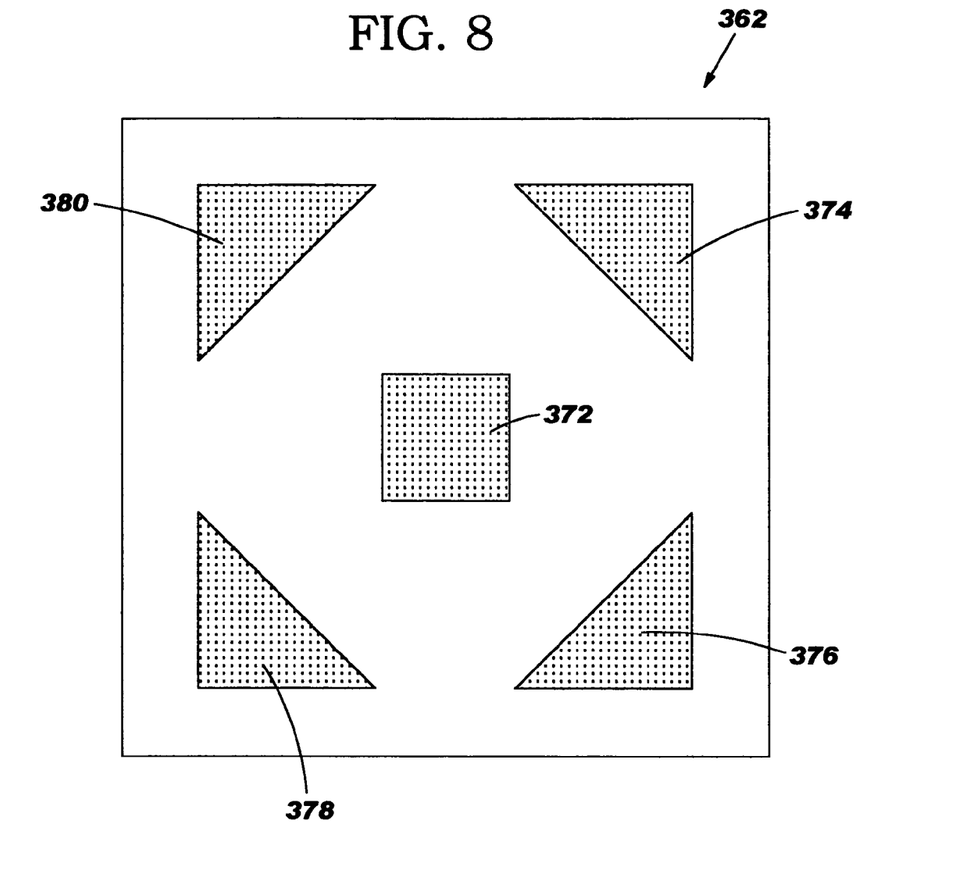
FIG. 8 is a schematic diagram illustrating a two-dimensional scrolling control according to embodiments of the present invention.

A two-dimensional scrolling control 362 is situated at a common intersection between the horizontal and vertical peripheral controls 354, 358. An expanded view of the two-dimensional scrolling control 362 is shown in FIG. 8. The scrolling control 362 includes four directional components 374, 376, 378, and 380. The upper-right directional component 374 corresponds to a direction pointing towards the upper-right hand corner of the display area 364, the lower-right directional component 376 corresponds to a direction pointing towards the lower-right hand corner of the display area 364, and so forth. The data 352A, 352B in FIGS. 6 and 7 illustrates scrolling motion responsive to a user selection of the lower-right directional component 376. That is, the data 352A displayed in FIG. 6 illustrates the display area 364 before the user selects the lower-right directional component 376. The data 352B displayed in FIG. 7 illustrates the display area 364 after the user selects the lower-right directional component 376. Responsive to the user selection, the data is scrolled down and to the right, that is, along a diagonal towards the lower-right hand corner of the display area 364.

The distance that the data is scrolled may be a preset distance ranging from a pixel to a display area 364 or larger. The distance that the data is scrolled by selecting one of the directional components 374, 376, 378, and 380 can be a pre-programmed feature of the scrolling control 362 or it can be an option that, can be controlled by the user. For example, the user could control the properties of the directional components 374, 376, 378, and 380 by selecting the distance that the data is scrolled. In the example shown by FIGS. 6 and 7, the data 352A, 352B is scrolled by an area equal to about the size of the display area 364, or a "page." As a result, the lower-right hand corner of the data 352A in FIG. 6 abuts the upper-right hand corner of the data 352B in FIG. 7.

The two-dimensional scrolling control 362 of FIG. 8 also has a centering icon 372. If the user selects the centering icon, the data 352A, 352B in the display area 364 scrolls or moves abruptly to the center of the display area 364. The centering icon 372 can provide a reference point for the user. For example, if the user is uncertain as to where the data 352A, 352B is located in the larger area of data 352 (FIG. 5), the user can select the centering icon 372 to find the center of the data 352.

In some embodiments, feedback is provided to the user interface that indicates that a vertical or horizontal limit of the data 352 has been reached. For example, if the data 352 is being displayed such that the display area 364 is at a horizontal limit that has been reached and the data 352 cannot be scrolled further in one direction, feedback to the user interface may indicate that the limit has been reached. The feedback can be audio, e.g., a noise through a speaker, or visual feedback on the display 350, e.g., a change of color of the directional component 374, 376, 378, and 380. Operations to provide such feedback according to particular embodiments are illustrated in FIG. 4B as described above.

Figure 9:
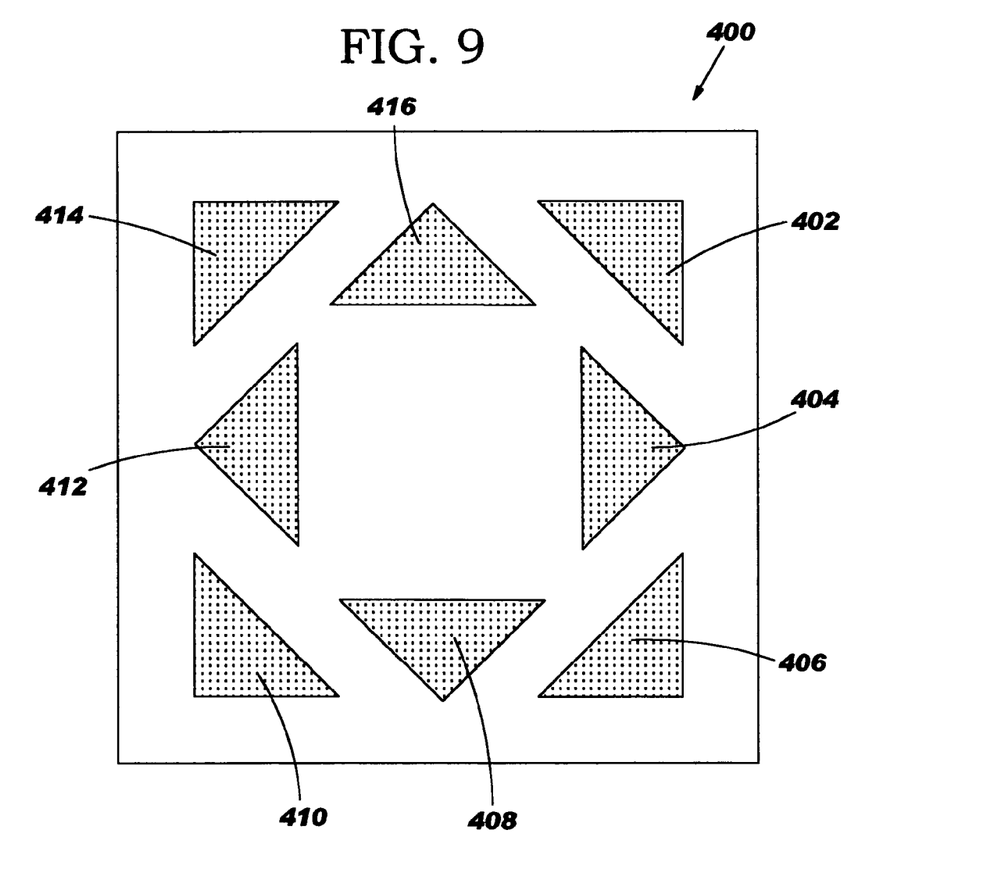
FIG. 9 is a schematic diagram illustrating a two-dimensional scrolling control having eight directional components according to embodiments of the present invention.

The two-dimensional scrolling control can have various numbers of directional components. For example, as shown in FIG. 9, the two-dimensional scrolling control 400 can have eight directional components 402, 404, 406, 408, 410, 412, 414, and 416. Directional components 402, 406, 410, and 414 can be the same as directional components 374, 376, 378, and 380 in FIG. 8, that is, corresponding to the respective diagonals in a display area. Directional components 404, 408, 412 and 416 can correspond to scrolling motion directed right, down, left, and up, respectively.

Figure 10:
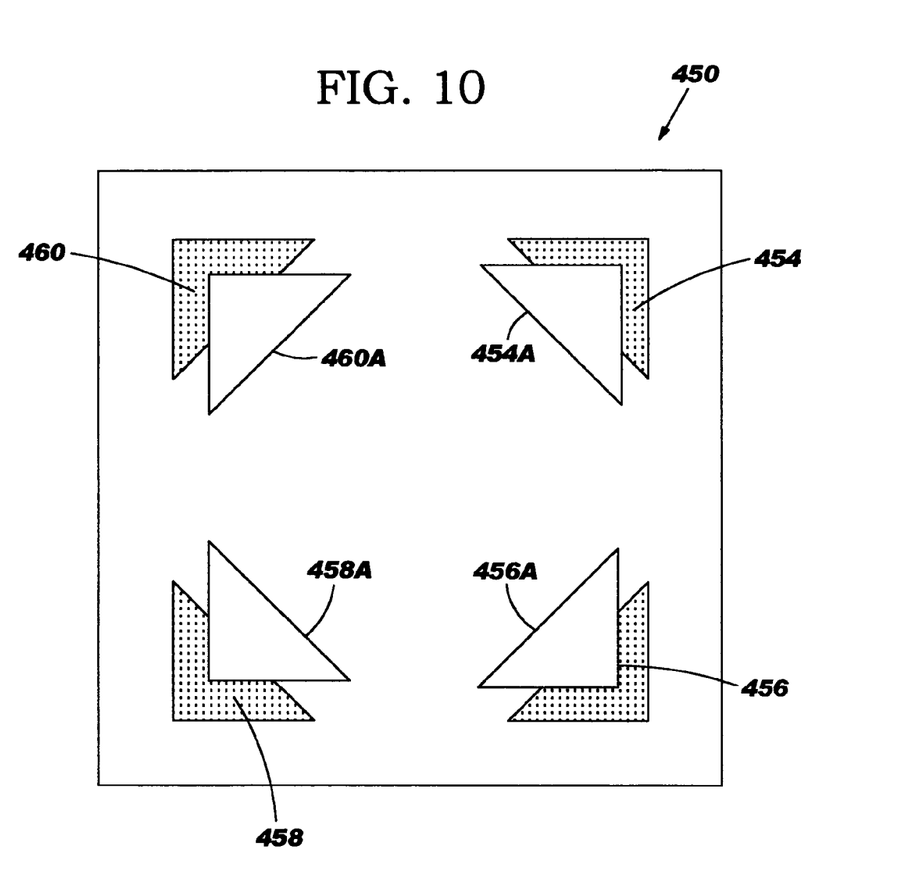
FIG. 10 is a schematic diagram illustrating a two-dimensional scrolling control having two directional components corresponding to one direction according to embodiments of the present invention.

FIG. 10 illustrates embodiments of the present invention having more than one directional component for a single direction. As illustrated, the two-dimensional scrolling control 450 can include four pairs of diagonal directional components 454 and 454A, 456 and 456A, 458 and 458A, and 460 and 460A. Each component in a diagonal pair can correspond to a scrolling distance, for example, so that one directional component in the pair moves a longer distance than the other directional component in the pair. For example, directional components 454, 456, 458, and 460 could be configured to scroll the display area by one display page of distance in the respective diagonal directions, and directional components 454A, 456A, 458A, and 460A could be configured to scroll the display area by roughly the size of a character to as small as a pixel length of distance. Alternatively, the scrolling components 454, 456, 458 and 460 could be configured to scroll in a diagonal direction to the limit of the data in the display area, and scrolling components 454A, 456A, 458A, and 460A could scroll the displayed data on display page of distance.

While the present invention has been described with reference to a client-server architecture, as will be appreciated by those of skill in the art, the present invention may be provided as a stand-alone application.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of scrolling data in a display window having peripheral controls on a user interface of a data processing system, comprising:
    providing a two-dimensional scrolling control icon integrated as part of the peripheral controls, the two-dimensional scrolling control icon comprising at least three directional components, each directional component associated with a direction on the display window, at least one of the directions corresponding to a change in both of the two dimensions;
    accepting user input from a user, the user input comprising a selected directional component; and
    scrolling the data in the display window in the direction associated with the selected directional component.

2. The method of claim 1, wherein the two-dimensional scrolling control icon is in a fixed location with respect to the peripheral controls.

3. The method of claim 1, wherein the peripheral controls comprise a first control portion extending along a horizontal periphery of the display window and a second control portion extending along a vertical periphery of the display window, and wherein providing a two-dimensional scrolling control icon further comprises providing a two-dimensional scrolling control icon at a common intersection between the first control portion and the second control portion.

4. The method of claim 3, wherein the first control portion comprises a horizontal scroll bar and the second control portion comprises a vertical scroll bar.

5. The method of claim 4 wherein the two-dimensional scrolling control icon is a rectangular icon and the at least three directional components are confined within the rectangular icon.

6. The method of claim 5, wherein the two-dimensional scrolling control icon excludes the horizontal scroll bar and the vertical scroll bar.

7. The method of claim 1, wherein the two-dimensional scrolling control icon further comprises a centering icon, the method further comprising scrolling the data in the display window to a center of the display window if the user input comprises selection of the centering icon.

8. The method of claim 1, further comprising: providing feedback to the user interface indicating that a vertical and/or horizontal limit of the data in the display window has been reached.

9. The method of claim 8, wherein the feedback comprises audio feedback.

10. The method of claim 8, wherein the feedback comprises display feedback.

11. The method of claim 1, wherein the two-dimensional scrolling control icon comprises at least eight directional components.

12. The method of claim 1, wherein the two-dimensional scrolling control icon comprises a first and a second directional component for a single direction, the first directional component and the second directional component corresponding to different scrolling distances.

13. A computer program product for scrolling data in a display window having peripheral controls on a user interface of a data processing system, comprising:
  a computer readable medium having computer readable program code embodied therein, the computer readable program code comprising:
  computer readable program code which provides a two-dimensional scrolling control icon integrated as part of the peripheral controls, the two-dimensional scrolling control icon comprising at least three directional components, each directional component associated with a direction on the display window, at least one of the directions corresponding to a change in both of the two dimensions;
  computer readable program code which accepts user input from a user, the user input comprising a selected directional component; and
  computer readable program code which scrolls the data in the display window in the direction associated with the selected directional component.

14. The computer program product of claim 13, wherein the peripheral controls comprise a first control portion extending along a horizontal periphery of the display window and a second control portion extending along a vertical periphery of the display window, the two-dimensional scrolling control icon being at a common intersection between the first control portion and the second control portion.

15. The computer program product of claim 14, wherein the first control portion comprises a horizontal scroll bar and the second control portion comprises a vertical scroll bar.

16. The computer program product of claim 15, wherein the two-dimensional scrolling control icon is a rectangular icon and the at least three directional components are confined within the rectangular icon.

17. The computer program product of claim 16, wherein the two-dimensional scrolling control icon excludes the horizontal scroll bar and the vertical scroll bar.

18. A system for scrolling data in a display window having peripheral controls on a user interface of a data processing system, comprising:
  a display window control module implemented in a memory device, the display window control module configured to provide a two-dimensional scrolling control icon integrated as part of the peripheral controls, the two-dimensional scrolling control icon comprising at least three directional components, each directional component associated with a direction on the display window, at least one of the directions corresponding to a change in both of the two dimensions;
  an I/O device driver implemented in the memory device, the I/O device driver configured to accept user input from a user, the user input comprising a selected directional component; and
  a processor coupled to the memory device and to a display device, the processor configured to facilitate scrolling the data in the display window in the direction associated with the selected directional component.

19. The system of claim 18, wherein the peripheral controls comprise a first control portion extending along a horizontal periphery of the display window and a second control portion extending along a vertical periphery of the display window, the two-dimensional scrolling control icon being at a common intersection between the first control portion and the second control portion.

20. The system of claim 19, wherein the first control portion comprises a horizontal scroll bar and the second control portion comprises a vertical scroll bar.

21. The system of claim 20, wherein the two-dimensional scrolling control icon is a rectangular icon and the at least three directional components are confined within the rectangular icon.

22. The system of claim 21, wherein the two-dimensional scrolling control icon excludes the horizontal scroll bar and the vertical scroll bar.

23. A display device to display a two-dimensional scrolling control icon for controlling a display window having peripheral controls that displays data on a data processing system, the scrolling control icon comprising:
  at least three directional components, each directional component associated with a direction on the display window, at least one of the directions corresponding to a change in both of the two dimensions;
  wherein the directional components are configured such that user input from a user to select a directional component causes scrolling of the data in the display window in the direction associated with the selected directional component; and
  wherein the two-dimensional scrolling control icon is integrated as part of the peripheral controls.

24. The two-dimensional scrolling control icon of claim 23, wherein the peripheral controls comprise a first control portion extending along a horizontal periphery of the display window and a second control portion extending along a vertical periphery of the display window, the two-dimensional scrolling control icon being at a common intersection between the first control portion and the second control portion.

25. The two-dimensional scrolling control icon of claim 24, wherein the first control portion comprises a horizontal scroll bar and the second control portion comprises a vertical scroll bar.

26. The two-dimensional scrolling control icon of claim 23, wherein the directional components are configured to indicate potential directions of movement of data in the display window.

* * * * *